United States Patent
Short et al.

(10) Patent No.: US 7,079,645 B1
(45) Date of Patent: Jul. 18, 2006

(54) SPEAKER VOLUME CONTROL FOR VOICE COMMUNICATION DEVICE

(75) Inventors: Shannon M. Short, Atlanta, GA (US); William A. Hartselle, Norcross, GA (US); Vernon Meadows, Lilburn, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 565 days.

(21) Appl. No.: 10/017,586

(22) Filed: Dec. 18, 2001

(51) Int. Cl.
*H04M 9/00* (2006.01)

(52) U.S. Cl. .................. 379/388.03; 379/390.03; 379/395; 379/387.01

(58) Field of Classification Search .......... 379/387.01, 379/388.01, 388.02, 388.03, 388.04, 388.06, 379/390.01, 390.03, 395; 381/71.1, 71.4, 381/71.6, 74, 77, 81, 104, 107, 111; 455/570, 455/575.2, 355
See application file for complete search history.

(56) References Cited

U.S. PATENT DOCUMENTS

| | | | |
|---|---|---|---|
| 4,625,083 A | 11/1986 | Poikela | |
| 5,485,515 A | 1/1996 | Allen et al. | |
| 5,615,256 A * | 3/1997 | Yamashita | 379/390.01 |
| 5,802,164 A * | 9/1998 | Clancy et al. | 379/347 |
| 5,917,921 A | 6/1999 | Sasaki et al. | |
| 6,233,462 B1 * | 5/2001 | Kanai | 379/390.01 |
| 6,298,247 B1 * | 10/2001 | Alperovich et al. | 455/355 |
| 6,363,344 B1 * | 3/2002 | Higuchi | 379/388.04 |
| 2003/0044025 A1 | 3/2003 | Ouyang et al. | |

OTHER PUBLICATIONS

*The Duplan Corporation v. Deering Milliken, Inc., et al.* 197 USPQ 342.*

* cited by examiner

*Primary Examiner*—Jefferey F. Harold
(74) *Attorney, Agent, or Firm*—Withers & Keys, LLC

(57) ABSTRACT

A system and method for adjusting the volume level of a communications device in response to ambient noise. In one embodiment, ambient noise is sampled once and the volume of a speaker associated with the communications device is increased to, and maintained at, a level sufficient to overcome the ambient noise such that a user can easily carry on a conversation or hear what is being transmitted. In another embodiment, ambient noise is periodically sampled and the volume of the speaker is adjusted in response to the sampled ambient noise. The system and method provides enhanced user convenience and power saving advantages.

24 Claims, 4 Drawing Sheets

SPEAKER VOLUME CONTROL FOR VOICE COMMUNICATION DEVICE

BACKGROUND

1. Field of the Invention

The present invention relates generally to voice communication and, more specifically, to automated volume control to compensate for variable ambient noise levels.

2. Background of the Invention

Mobile telephones (or generally, mobile communications devices) have become ubiquitous; they show up in almost every environment. They are used in the home, at the office, in the car, on a train, at the airport, at the beach, at restaurants and bars, on the street, and almost any other imaginable venue. As might be expected, these diverse environments have relatively higher and lower levels of background or ambient noise. For example, there is generally less noise in a quiet home than there is in a crowded bar. Therefore, depending on the particular environment and its associated ambient noise level, it may be more or less difficult for the user of the mobile telephone to hear what another party is saying over the mobile telephone connection.

While some mobile telephones include a variable volume feature, it is up to the user of the mobile telephone to manually adjust the volume to a level that is sufficient to maintain a conversation or to successfully hear what is being transmitted.

Manual volume control is particularly disadvantageous when, for example, a mobile telephone user moves from one environment with a first level of ambient noise to a second environment with a second level of ambient noise. The user of the mobile telephone must adjust the volume to maintain a comfortably loud volume from the speaker of the mobile telephone. Similarly, some environments, such as sporting events, will have continually varying levels of ambient noise. Accordingly, it is very inconvenient, if not impossible, to properly adjust the volume of the mobile telephone speaker, in a timely manner, to properly compensate, comfortably, for the variable background or ambient noise. Further, it may also be dangerous to manually adjust volume while driving.

SUMMARY OF THE INVENTION

The present invention provides a novel system and method of adjusting the volume of a speaker associated with a communications device such as a mobile telephone. In accordance with an embodiment of the invention, an initial volume of the speaker is set when the mobile telephone is in a location having zero or substantially zero ambient or background noise. Such a location might be in a quiet room or in any relatively quiet space. Then, subsequently, if the features of the invention are enabled, the ambient noise is sampled and the volume of the speaker is automatically increased to a level sufficient such that the user of the mobile telephone can carry on a conversation or hear what is being transmitted to him. In an alternative embodiment, the ambient noise is continuously, or at least periodically, sampled and the speaker volume is continuously or periodically adjusted to compensate for the background noise.

It is therefore an object of the present invention to provide a system and method that enhances the convenience of using a mobile communications device, even in a location having relatively loud ambient noise.

It is also an object of the present invention to improve power consumption of a communications device by increasing the volume of the speaker only to a level necessary to overcome the then-current ambient noise.

It is still another object of the present invention to reset the volume of the speaker to an initial volume level if and when a call on communications device is complete or the power of the communications device is turned off.

These and other objects of the present invention will become apparent upon reading the following detailed description in conjunction with the associated drawings.

DETAILED DESCRIPTION OF THE INVENTION

The present invention provides a unique speaker volume control feature for a communications device such as a conventional wire line telephone or mobile telephone. While the present invention has applicability to at least these types of communications devices, the principles of the present invention are particularly applicable to all types of communications devices. For simplicity, the following description employs the term "mobile telephone" as an umbrella term to describe the several embodiments of the present invention, but those skilled in the art will appreciate that the use of such term is not to be considered limiting to the scope of the invention, which is set forth by the claims appearing at the end of this description.

Figure 1:
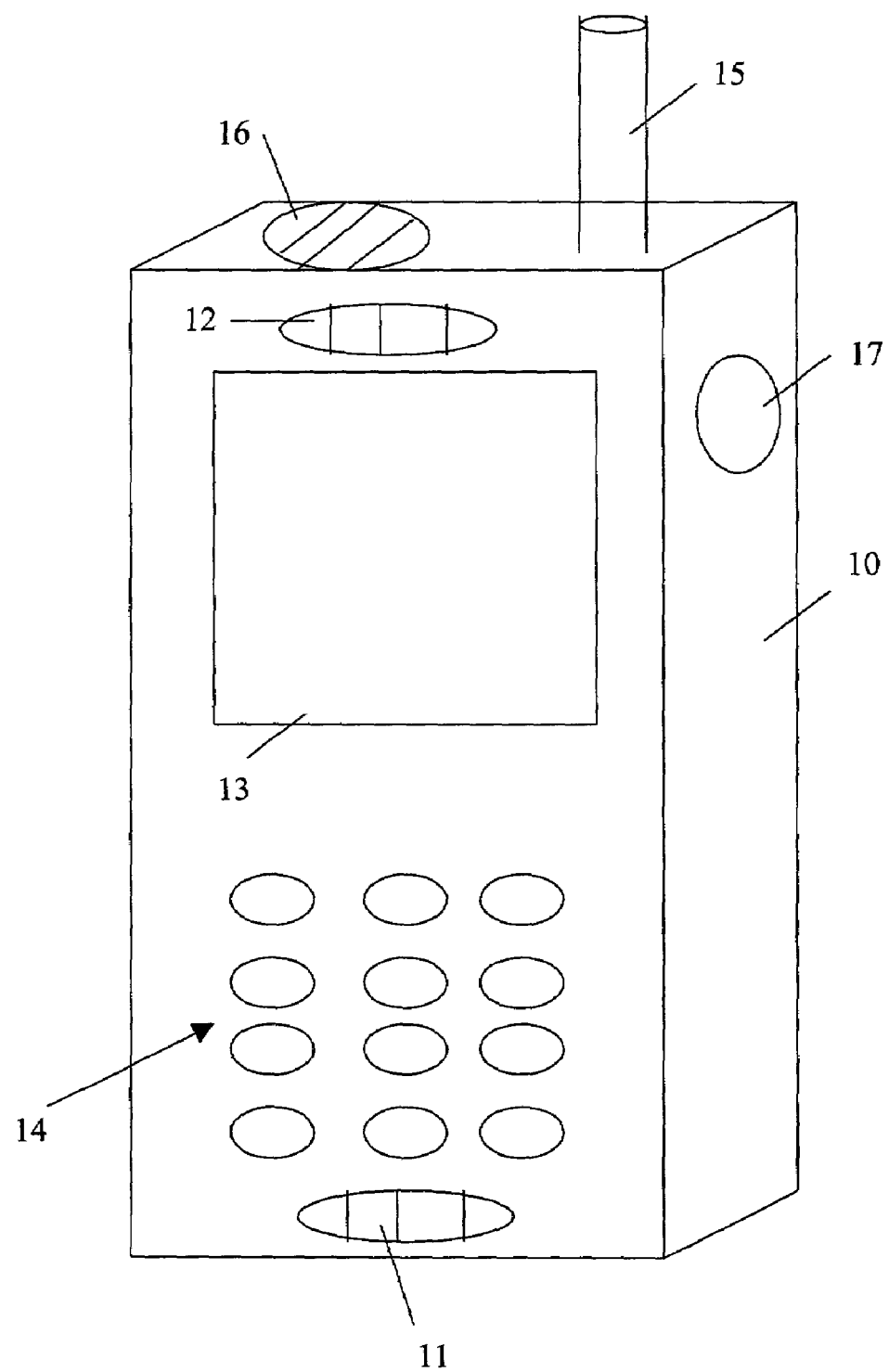
FIG. 1 illustrates an exemplary mobile telephone including an optional second microphone for sampling ambient noise and an enable/disable button in accordance with the present invention.

FIG. 1 illustrates an exemplary mobile telephone 10 that comprises a microphone 11, a speaker 12, a display screen 13, a keypad 14 and an antenna 15. Optionally, a second microphone 16 for sampling ambient noise level and an ambient noise compensation enable/disable button 17 may also be provided. These latter two elements will be described more fully below. Those skilled in the art will appreciate that speaker 12 could be replaced by an ear piece (not shown) that is worn by the mobile telephone user in the conventional manner. Speaker 12 is used herein to mean the device by which sound is transferred from the mobile telephone to the user. Also, display screen 13 could be a touch screen display, which might incorporate keypad 14 as well as enable/disable button 17.

In accordance with preferred embodiments of the present invention, speaker volume control on a mobile telephone is effected in a (i) preset or (ii) an environmentally sensitive manner. In both cases, however, the overriding principle of the present invention is to provide some form of automatic speaker volume control for speaker 12 so that the user of mobile telephone 10 need not manually change the volume, and so that a user of mobile telephone 10 can more easily carry on a conversation over the telephone.

Figure 2:
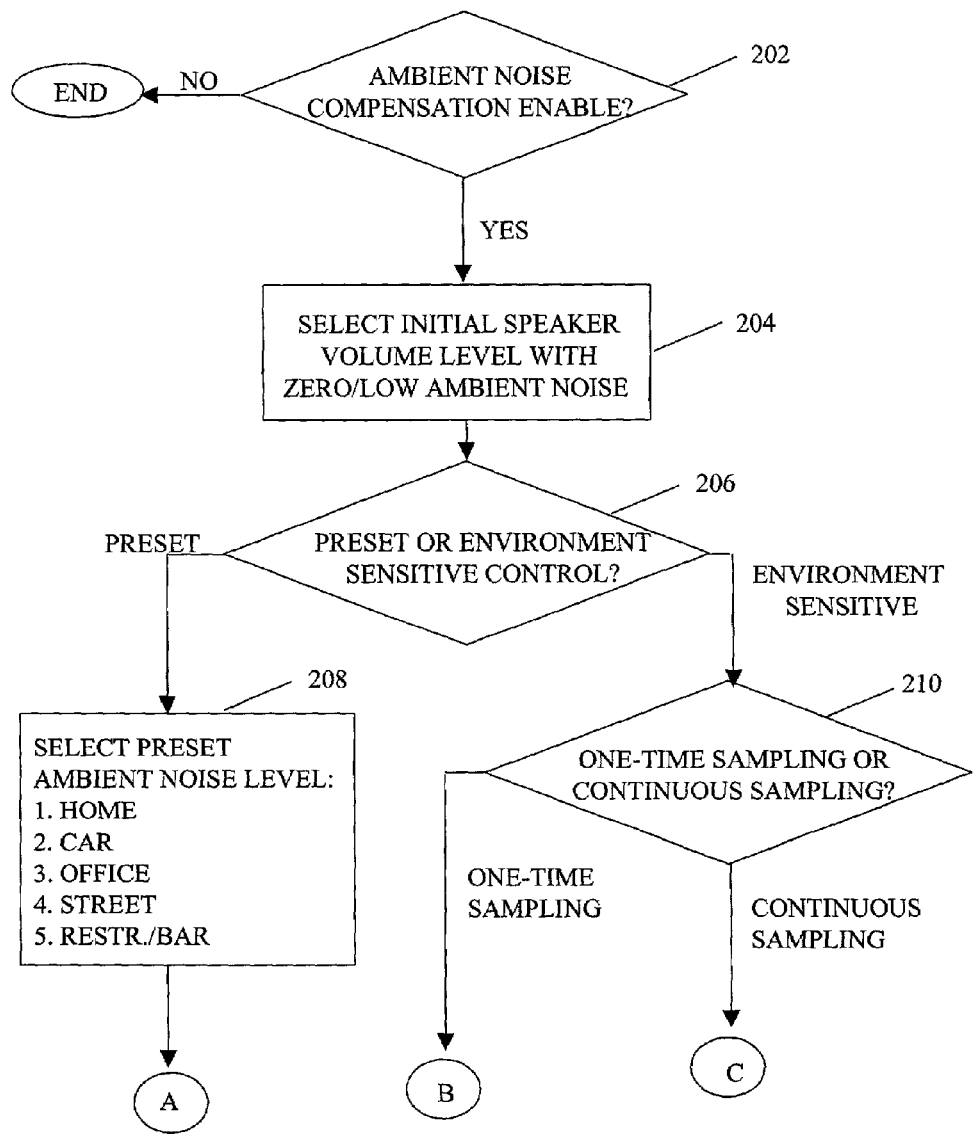
FIG. 2 illustrates an exemplary series of steps that could be presented via a menu in accordance with the present invention.

FIG. 2 shows an exemplary series of steps that are preferably presented via a menu via display 13. At step 202 it is determined whether automated volume control or ambient noise compensation should be enabled. If ambient noise compensation is not desired then the process ends. If, on the other hand, the functionality of the present invention is desired, then at step 204, the user of mobile telephone selects a desired initial speaker volume level while in an environment with substantially zero ambient or background noise. This initial volume level selection can be performed using the existing manual volume control available on many mobile telephones. If no such manual volume control is provided then the initial volume setting is preferably the default volume setting of the mobile telephone. The initial selected volume setting is preferably the lowest volume level from which subsequent volume increases and adjustments occur. The initial selected volume level is stored within mobile telephone 10 in accordance with well-known techniques, including, e.g., the use of random access memory (RAM).

At step 206, the user optionally selects between a preset amount of ambient noise compensation or a more dynamic compensation technique in which ambient noise compensation is sensitive to a particular environment via a sampling methodology described below. If preset volume control is selected, then at step 208 the user of mobile telephone 10 preferably selects a preset ambient noise level that the user desires to overcome. For example, the user may select any one of ambient noise levels 1–5 corresponding to the typical ambient noise that one would encounter in e.g., respectively, a home setting, a car, an office setting, a street setting or a restaurant/bar setting. Each of the foregoing settings would have an ever-increasing ambient noise level associated therewith and an attendant greater speaker volume.

Figure 3A:
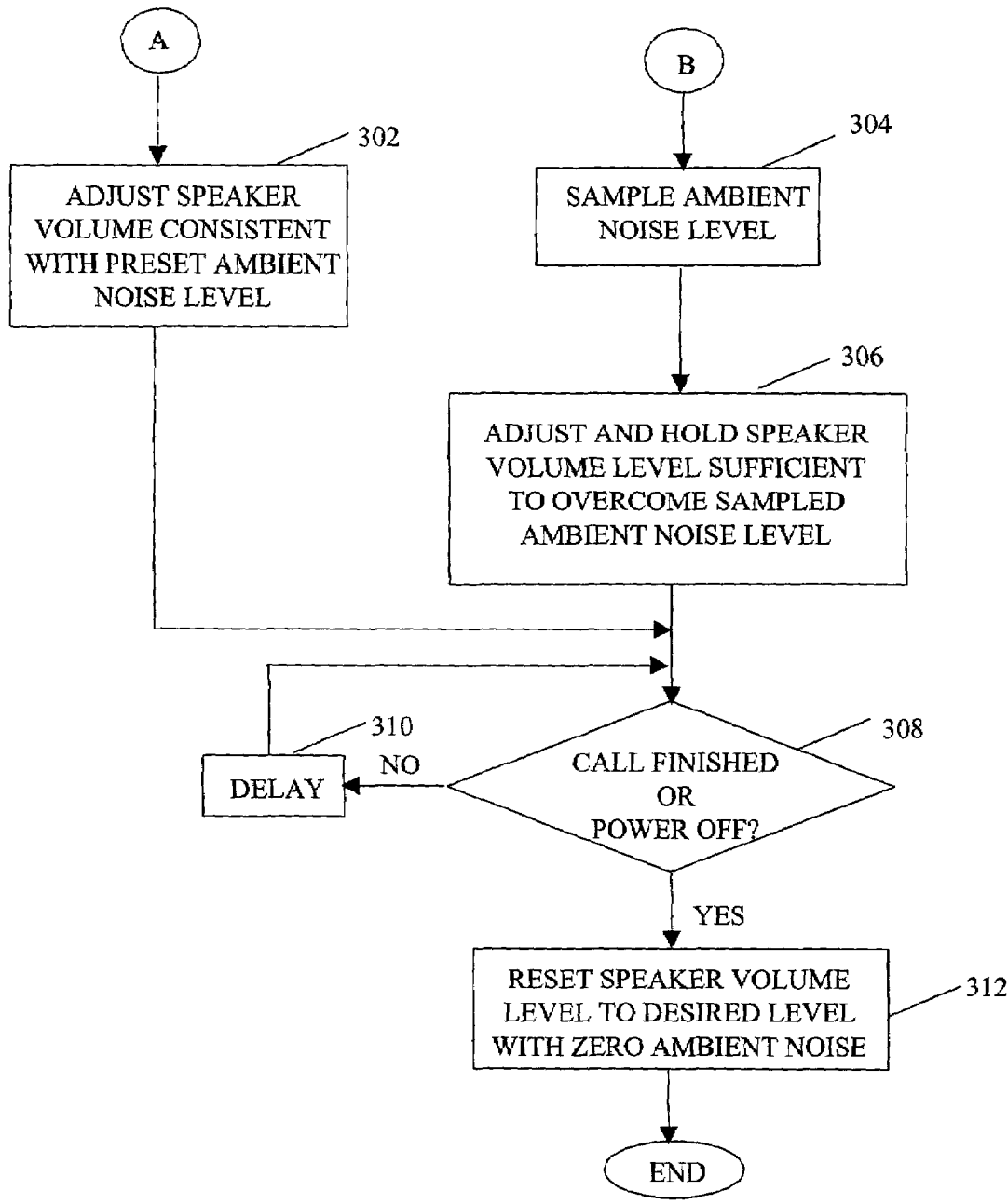
FIGS. 3A and 3B illustrate exemplary process steps that are undertaken depending on the type volume control selected, in accordance with the present invention.

After step 208, the menu aspect of the volume control feature of the present invention is terminated and the process moves to step 302 in FIG. 3A. In step 302 the volume of speaker 12 is increased to a level that is capable of overcoming the preset ambient noise level. Thus, whenever the user of mobile telephone 10 is in an environment that has that selected noise level, the volume of speaker 12 would be such that the user would be able to hear despite the ambient or background noise. It is well known in the art of acoustics, for example, how loud a sound must be for a person to hear that sound over background noise. Thus, adjusting the speaker volume to the appropriate level is well within the skill of the art.

Still referring to FIG. 3A, in an optional aspect of the present invention, the ambient noise level selected at step 208 can be reset automatically. In this case, at step 308, it can be determined whether the particular telephone call has finished or the power to mobile telephone 10 has been turned off. These are two possible conditions in which the user of mobile telephone 10 might no longer need, in a subsequent call, the ambient noise compensation feature of the present invention. If it is determined at step 308 that neither of these conditions has been satisfied, then a period of delay at step 310 is imposed and the cases are again monitored at step 308. The delay of step 310 may be on the order of fractions of a second, a second, several seconds or minutes, for example. If, at step 308 it is determined that a call has been finished or the power to mobile telephone 10 is being turned off (or has been turned off), then the volume level of speaker 12 is preferably reset to the desired speaker volume level with substantially zero ambient noise, whereby when a new call is placed or the power is turned back on, the user of mobile telephone 10 hears a reasonable volume level through speaker 12, with the assumption being that the user is now in a more quiet environment.

Referring back to FIG. 2, instead of a preset volume control as described above, the user of mobile telephone 10 can choose, at step 206, to have volume control or ambient noise compensation to be environmentally sensitive by sampling the ambient noise level directly at mobile telephone 10. As will become apparent from the description below, sampling ambient noise and compensating speaker volume in response to the sampled ambient noise can provide distinct advantages over the preset volume control embodiment. Techniques for sampling noise levels are well known in the art and may include analog and/or digital techniques.

Assuming the user of mobile telephone 10 chooses automatic volume control via sampling, then at step 210 the user preferably decides whether one-time sampling or continuous sampling is desired. If one-time sampling is selected, then, referring to FIG. 3A, at step 304 the ambient noise level to which mobile telephone 10 is then being subjected to is measured or sampled. Measuring can take place via microphone 11 or, optionally, via a second microphone 16 that is provided for the express purpose of sampling ambient noise. A second microphone would be less affected by the user's own voice when taking the measurement and, thus, might be more desirable in certain implementations of the present invention.

Once the ambient noise level is sampled, then at step 306, the volume level of the speaker is adjusted and held at a level sufficient to overcome the sampled ambient noise level. In other words, the volume level of speaker 12 is set sufficiently high such that the user of mobile telephone 10 can carry on a reasonable conversation or simply listen to what is being transmitted to him without having to manually control the volume to speaker 12 and without having the ambient noise drown out the incoming signal.

The foregoing one-time ambient noise sampling embodiment differs from the previous preset embodiment in that by sampling the current ambient noise, it is possible to more accurately determine the volume level necessary for speaker 12 to overcome the background noise. This has at least one advantage over the former embodiment whereby it is possible to potentially save battery power by increasing the volume only to the extent necessary to maintain a conversation or listen to what is being transmitted, rather than having a preset volume level that may be louder than is necessary, thereby unnecessarily wasting battery power.

As in the preset volume control embodiment, the process according to the one-time sampling embodiment may continue with steps 308, 310 and 312 to ensure that when mobile telephone 10 is in a new environment at a later time, the volume at speaker 12 will not be inconsistent with the ambient noise in the new environment.

Figure 3B:
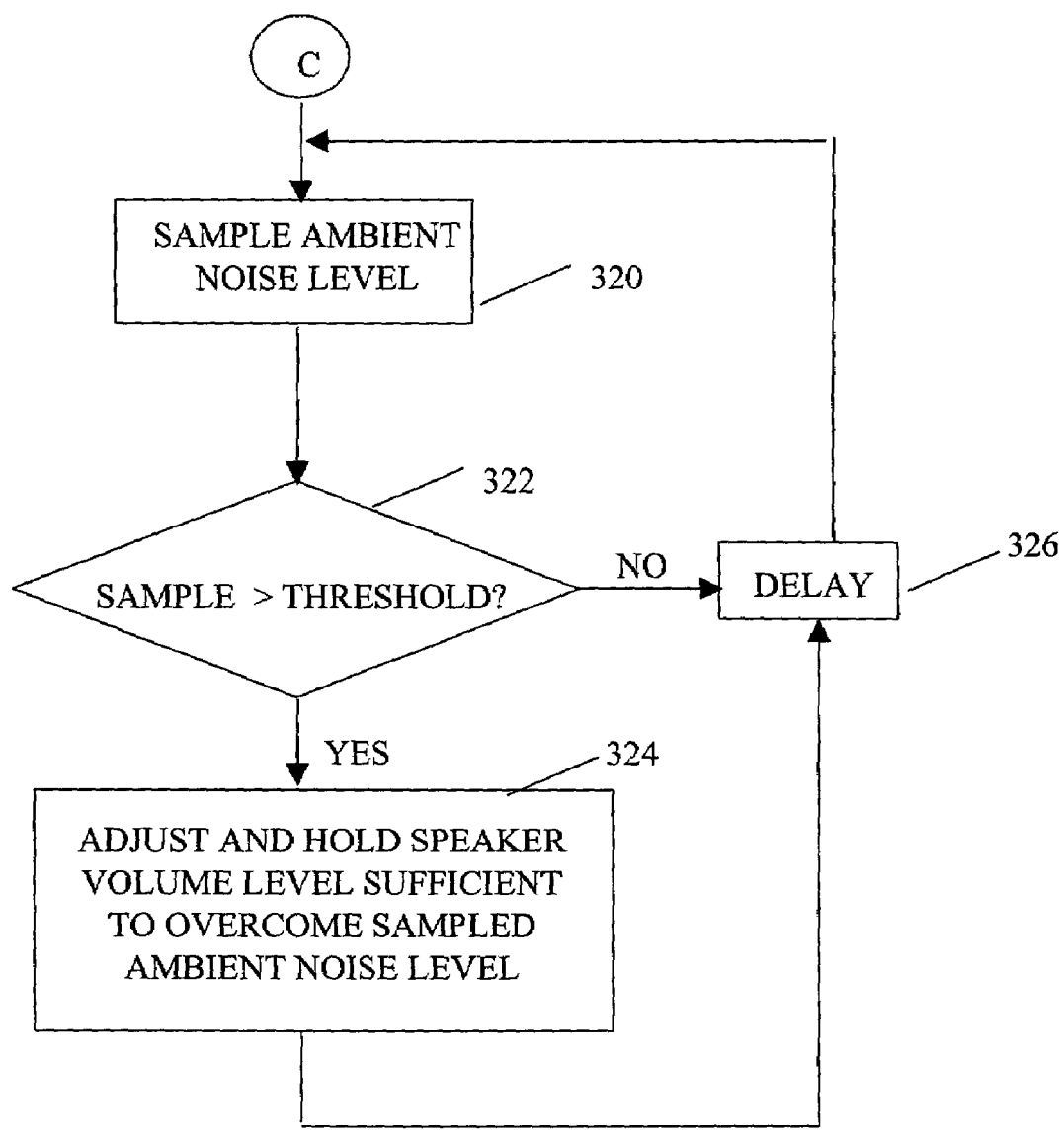

If, at step 210 (FIG. 2), the user of mobile telephone selected continuous sampling, then the process continues with step 320 in FIG. 3B wherein the ambient noise level in the particular environment is sampled (just as in step 304 described above). Then, it is determined at step 322 whether the sampled ambient noise level is greater than a threshold ambient noise level, such as the zero or substantially zero ambient noise level used to determine the initial speaker volume level without ambient noise (step 204). If the sampled ambient noise level is greater than this threshold level, then at step 324 the speaker volume level is adjusted (higher, at least when the first time adjustment occurs) and held at a level sufficient to overcome the sampled ambient noise level. Immediately thereafter the process continues with step 326 where a delay is imposed on the order of, e.g., fractions of a second, a second, several seconds or minutes, whereupon the process returns to step 320 where the ambient noise level is again sampled, i.e., the ambient noise is re-sampled. In this way, ambient noise is continuously, or at least periodically, sampled so that even if the ambient noise level changes from one moment to the next the user of mobile telephone 10 will still be able to carry on a conversation or hear what is being transmitted to him despite the changing ambient noise level. If at step 322, the sampled ambient noise level is not greater than the threshold (meaning that the ambient noise level is as low as substantially zero ambient noise) then the delay of step 326 is again imposed and the process returns to step 320 as indicated.

Optionally, steps similar to steps 308, 310 and 312 may also be employed in the context of the continuous or periodic sampling embodiment just described. In such a case, if a call were not finished or mobile telephone 10 were not powered off then the process would return to the delay of step 326. Otherwise, the speaker volume level would be reset to the level set initially, without ambient noise.

As mentioned above, there is preferably an ambient noise compensation enable/disable switch 17 or some other means for enabling and disabling the volume control provided by the present invention without having to use the menu process shown in FIG. 2. For example, mobile telephone could be configured to run the menu of FIG. 2 in an initialization routine of mobile telephone 10 wherein once the initial volume setting is selected and the type of volume control is selected, switch 17 is used merely to turn on and off the selected type of volume control.

As indicated above, continuous sampling is particularly useful for dynamic environments in which the ambient noise level is changing from one moment to another. However, some people may find that a continuously changing volume from speaker 12 can be distracting. Accordingly, such users may be more comfortable using either the preset automatic volume control or the one-time sampling technique described above.

In any event, no matter which embodiment of the present invention is selected, there are several attendant advantages that are realized. First, there can be a power saving advantage in that the volume of speaker 12 will be set only sufficiently high to maintain a conversation or listen to what is being transmitted, rather than a volume level that is unnecessarily high.

Second, the present invention provides significant convenience to the user of mobile telephone 10. Instead of having to manually control the volume of speaker 12, volume control can be automatically preset or can be controlled via various degrees of sampling. In this regard, delay step 326 is preferably configurable so that the user of mobile telephone 10 can decide how responsive the volume control or compensation ought to be. For example, a user of mobile telephone 10 may be in an environment where there is only a very seldom loud noise and, even though a higher volume at speaker 12 would be desirable for those particularly loud moments, the increase in volume level at speaker 12 may be more of a distraction than an advantage.

Finally, the present invention is particularly helpful to hearing impaired people who might have trouble generally with background noise.

Those skilled in the art will appreciate that the steps described herein and illustrated in FIGS. 2, 3A and 3B are preferably implemented in software or firmware that is loaded in mobile telephone 10. Further, it is well within the skill of the art to develop the particular coding to implement the functionality described herein.

The foregoing disclosure of the preferred embodiments of the present invention has been presented for purposes of illustration and description. It is not intended to be exhaustive or to limit the invention to the precise forms disclosed.

Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of controlling a speaker volume of a communications device, comprising:
   providing to a user of the communications device at least two different options for automatically controlling the speaker volume based on ambient noise;
   receiving a selection of one of the at least two different options from the user; and
   implementing a volume control action that is based on the ambient noise and that corresponds to the option selected by the user to thereby control the speaker volume based on the ambient noise.

2. The method of claim 1 wherein upon selection of one of the at least two options, the method further comprises:
   (a) sampling the ambient noise level in the vicinity of the communications device to detect a first sample noise level;
   (b) determining whether the first sample noise level is greater than a threshold level;
   (c) automatically adjusting the volume of the speaker to a first volume level sufficient to overcome the first sample noise level and maintaining the volume of the speaker at the first volume level;
   (d) resampling the ambient noise level in the vicinity of the communications device to detect a second sample noise level;
   (e) determining whether the second sample ambient noise level is greater than the threshold level; and
   (f) automatically readjusting the volume of the speaker to a second volume level sufficient to overcome the second sample noise level and maintaining the volume of the speaker at the second volume level.

3. The method of claim 1, further comprising selecting an initial speaker volume level.

4. The method of claim 1, further comprising enabling steps (a)–(f) via a button associated with the communications device.

5. The method of claim 1, further comprising repeating steps (d)–(f).

6. The method of claim 5, further comprising delaying repeating step (d) after step (f) for a predetermined amount of time.

7. The method of claim 1, wherein step (f) comprises one of increasing and decreasing speaker volume.

8. The method of claim 1, wherein ambient noise sampling is accomplished via a microphone.

9. The method of claim 8, wherein ambient noise sampling is accomplished with a microphone other than a microphone used for voice communication.

10. The method of claim 1, further comprising resetting speaker volume to an initial setting.

11. The method of claim 1, wherein the communications device comprises a mobile telephone.

12. The method of claim 1, wherein the at least two different options comprises use of a one time ambient noise sample to automatically adjust the speaker volume one time for a call and use of a repetitive ambient noise sample to repetitively adjust the speaker volume for a call.

13. A method of compensating the volume of a speaker of a communications device in response to ambient noise, comprising the steps of:
   (a) selecting an initial volume level for the speaker in the presence of substantially zero ambient noise;
   (b) subsequently, after a call has been established on the communications device, sampling a non-zero level of ambient noise;
   (c) automatically increasing the volume of the speaker in response to the sampled nonzero level of ambient noise from the initial volume level to a level sufficient to overcome the sampled non-zero level of ambient noise;
   (d) maintaining the volume of the speaker at the level sufficient to overcome the sampled non-zero level of ambient noise for a predetermined period of time; and
   (e) resetting the volume to the initial volume level upon the call ending and before the establishment of a subsequent call.

14. The method of claim 13, wherein the communications device is a mobile communications device.

15. The method of claim 14, wherein the mobile communications device is a mobile telephone.

16. The method of claim 13, further comprising resampling the ambient noise and adjusting the volume of the speaker in response to the level of the resampled ambient noise.

17. A mobile communications device, comprising:
   a display screen, a speaker and at least one microphone housed in a body;
   means for providing at least two user selectable options for automatically adjusting a speaker volume level based on ambient noise;
   at least one of the options, chosen by the user, for adjusting the speaker volume level from an initial volume level in response to ambient noise is operable to sample the ambient noise, determine whether the sampled ambient noise is greater than a threshold level of ambient noise, and automatically causes the volume of the speaker to increase to a level sufficient to overcome the sampled ambient noise;
   means for resetting the speaker volume level to the initial volume level upon the call ending and before the establishment of a subsequent call; and
   means for receiving user input to activate and deactivate the means for adjusting independently of powering on and off the mobile communications device.

18. The device of claim 17, further comprising a second microphone, wherein the second microphone samples the ambient noise.

19. The device of claim 17, wherein the means for receiving input comprises a menu and wherein the display screen displays the menu.

20. The device of claim 17, wherein the means for receiving input comprises a button.

21. The device of claim 17, wherein the means for adjusting is operable to cause the volume of the speaker to decrease.

22. The device of claim 17, wherein the means for adjusting periodically samples the ambient noise.

23. The device of claim 17, wherein the means for adjusting is operable to set an initial volume level for the speaker.

24. The device of claim 23, wherein the means for adjusting is operable to reset the volume level of the speaker to the initial volume level.

* * * * *